United States Patent [19]
Steinberger et al.

[11] 3,815,929
[45] June 11, 1974

[54] POWER OPERABLE CHUCK

[75] Inventors: Josef Steinberger; Heinz Pohl, both of Dusseldorf, Germany

[73] Assignee: Paul Forkardt Kommanditgesellschaft, Dusseldorf, Germany

[22] Filed: Oct. 12, 1972

[21] Appl. No.: 296,936

[30] Foreign Application Priority Data
Oct. 13, 1971 Germany............................ 2150885

[52] U.S. Cl. .................................... 279/4, 82/40 R
[51] Int. Cl. ............................................ B23b 31/30
[58] Field of Search ........... 279/4; 82/40; 51/237 R; 91/458

[56] References Cited
UNITED STATES PATENTS

| | | |
|---|---|---|
| 2,731,952 | 1/1956 | Szabo.................................. 279/4 X |
| 3,091,256 | 5/1963 | Becker................................. 279/4 X |
| 3,618,270 | 11/1971 | Koide.................................. 82/40 R |

Primary Examiner—Francis S. Husar
Attorney, Agent, or Firm—Walter Becker

[57] ABSTRACT

A power operable chuck for turning machines with a pressure fluid operable cylinder piston assembly operatively connected to and rotatable with the chuck for acting upon the clamping jaws of the chuck, the chucking force exerted by the cylinder piston assembly upon the clamping jaws being automatically variable in conformity with exterior forces, e.g., the centrifugal force or the force exerted upon the cutting tool in the chuck, by correspondingly varying the fluid pressure in the fluid pressure operable cylinder piston assembly.

6 Claims, 3 Drawing Figures

POWER OPERABLE CHUCK

The present invention relates to a power operable chuck for turning machines, especially multi-chuck for pressure sensitive work pieces, with a pressure fluid operable cylinder which for obtaining the chucking force rotates together with the chuck and to which the pressure medium is conveyed through a pressure medium conveying housing.

With increasing speed of the rotating chuck, increasing centrifugal forces act upon the chucking or clamping elements, and these centrifugal forces have the effect of reducing the clamping force. In order also at high speeds to assure a sufficient clamping or chucking force, it has been customary heretofore, already during the standstill of the chuck, to generate such high chucking force that in spite of the reduction in the chucking or clamping force by the centrifugal forces there will remain a chucking force which at high operating speeds will still be sufficient.

Such excess in chucking force at the standstill of the chuck brings about the danger that the workpiece will be subjected to undesired deformations, especially if a pressure sensitive workpiece is involved as, for instance, thin-walled tubular bodies. With such pressure sensitive bodies it is, therefore, frequently necessary to reduce the chucking force at the standstill of the chuck. This in turn has the result that the chucking force will at high operating speeds not be sufficient and may lead to an increased danger of accidents.

To avoid the drawbacks of the above described chucks, it is known to provide jaw chucks with compensating weights which are respectively associated through a lever system with clamping jaws for compensating the centrifugal force to a certain extent. Chucks of this type are, however, due to the additional compensating weights of a rather complicated structure, are expensive to manufacture and require frequent repairs while also requiring a relatively large space so that they cannot be used in connection with every type of turning machines.

It is, therefore, an object of the present invention to provide a power operable chuck of the general character set forth above which, however, without any additional structures or features, will make it possible on the chuck to almost completely compensate for the forces influencing the chucking force, especially the centrifugal force and the chip removing force, and will do so regardless of whether the chucking elements are used for chucking the workpiece from the outside or from the inside.

This object and other objects and advantages of the invention will appear more clearly from the following specification in connection with the accompanying drawings, in which.

The chuck according to the present invention is characterized primarily in that the chucking force is adapted to be controlled in conformity with the force acting upon the chucking elements, especially in conformity with the centrifugal force and the chip removing force, the control being effected by a change in pressure in the pressure fluid cylinder piston assembly which in its turn is adapted to adjust the chucking force.

According to a further feature of the invention, the control of the chucking force is effected either by a tachometer which rotates proportionally with the speed of the chuck, and/or by a meter for receiving the chip removing force or the torque employed for the chip removing action which meters bring about a pressure control through an electronic control unit. The electronic control unit may, according to a further feature of the invention, control a pressure control valve which is arranged within a pump unit for generating the pressure in the pressure fluid cylinder piston assembly.

In order to take into consideration the different conditions prevailing when chucking a workpiece from the outside or from the inside, and also to be able to take into consideration the differing structural features of the respective chucks, the change in pressure is, according to a further feature of the invention, adjustable in conformity with differing characteristics. As characteristics in this connection there are to be mentioned the different weights of different attachment jaws, the size of the chuck, and the type of chuck construction. Moreover, it will be possible to take into consideration the minimum pressure and the speed from which on the pressure control will become effective.

Figure 1:
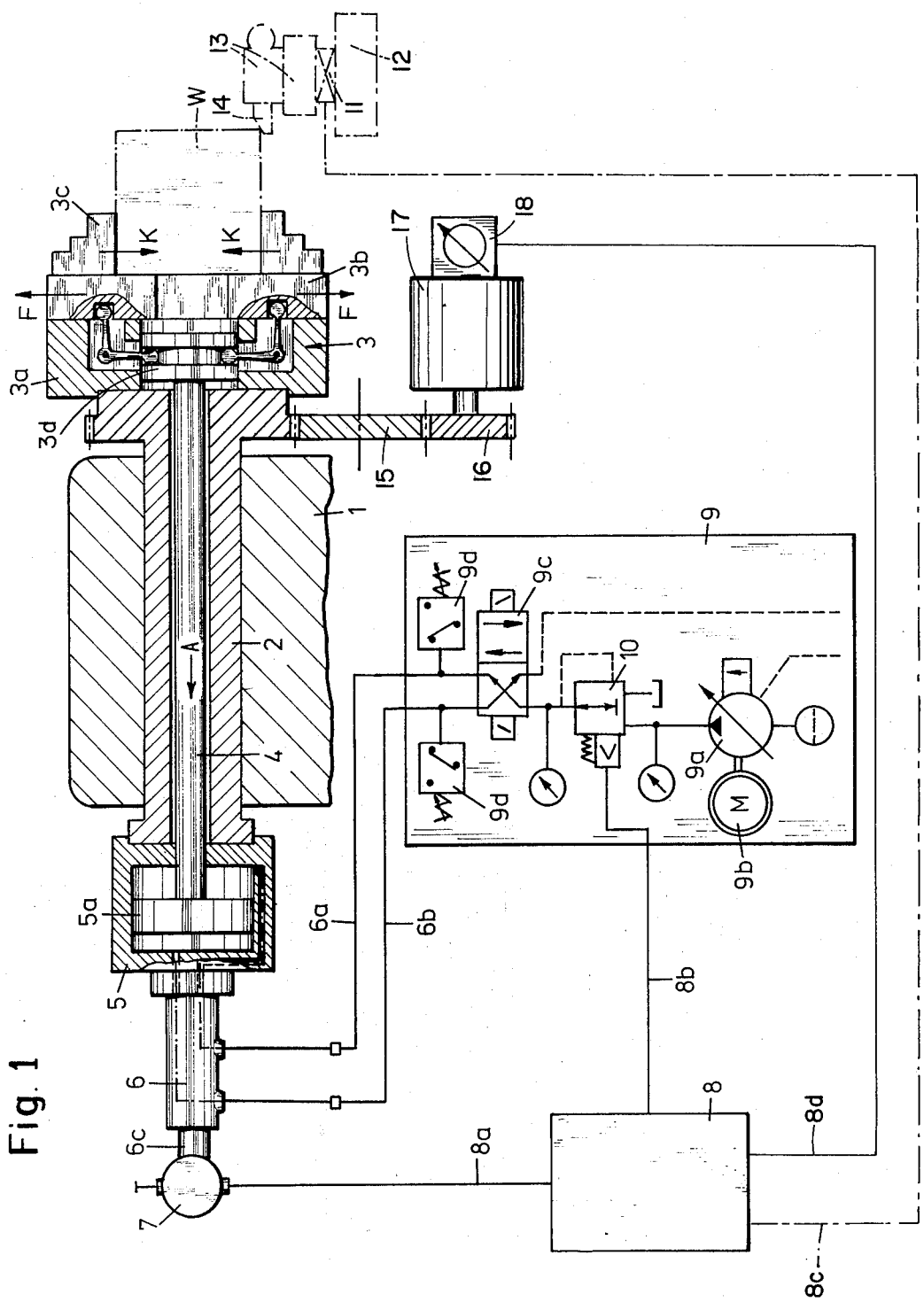
FIG. 1 is a side view of a chuck according to the invention employed for chucking a workpiece from the outside, FIG. 1 also showing the units for generating and controlling the pressure.
Figure 2:
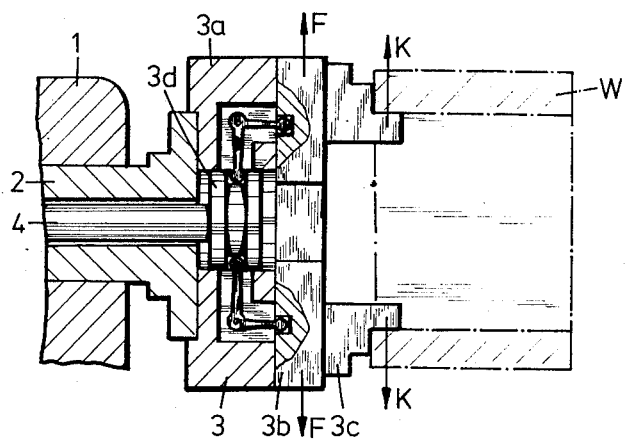
FIG. 2 shows a chuck according to the invention and similar to that of FIG. 1 but used for chucking a workpiece from the inside.

Referring now to the drawings in detail and FIG. 1 thereof in particular, the arrangement shown therein comprises a headstock 1 of a turning machine (not illustrated) with a spindle 2 having a chuck 3 connected to its front flange. The chuck 3 has has a chuck body 3a in which base jaws 3b are radially displaceably guided. The base jaws 3b which are equipped with attachment jaws 3c are adjusted through a chuck piston 3d through the intervention of levers, the chuck piston 3d being operable by a pullrod 4.

The pullrod 4 extends from the chuck piston 3d of the chuck 3 through the hollow spindle 2 to a pressure fluid cylinder 5 and is connected to a piston 5a which is reciprocable in the cylinder 5 and together with the latter forms the pressure fluid cylinder piston assembly. The cylinder 5 receives the pressure medium through a stationary pressure medium conveying housing 6 which is provided with connections to two pressure fluid conduits 6a and 6b respectively.

The pivot 6c which supports the housing 6 and is connected to the pressure fluid cylinder 5 rotates with the spindle 2. The pivot 6c extends beyond the housing 6 and has a tachometer 7 connected to its end. The tachometer 7 is through a control conduit 8a connected to an electronic control unit 8 which is adapted through a control conduit 8b to act upon a pressure control valve 10 which is arranged within a pump unit 9. Unit 9 includes a pump 9a which is operable by a pump motor 9b and which conveys the pressure medium through the pressure control valve 10 and one of the two pressure medium conduits 6a and 6b to the pressure cylinder piston system 5, 5a. For purposes of reversing the movement of the piston 5a in the pressure cylinder 5, there is behind the pressure control valve 10 and within the pump unit 9 provided a control valve 9c. In addition thereto, a pressure monitor or controller 9d is connected to each pressure medium conduit 6a, 6b.

For chucking the workpiece W from the outside in conformity with FIG. 1, it is necessary to produce a centripetally acting chucking force K. To this end, the pullrod 4 is moved in the direction of the arrow A. To obtain a chucking from the outside, the control conduit 6a is supplied with a pressure medium, for instance, oil under pressure.

Inasmuch as the centrifugal force F acting upon the clamping jaws 3b and 3c counteracts the chucking force K when the workpiece W is chucked from the outside, a considerable portion of the chucking force K exerted by the pressure fluid cylinder piston assembly 5, 5a is nullified at high speeds. To avoid this drawback, a pressure increase is set or adjusted at the electronic control unit 8 which pressure increase will in conformity with the speed of the spindle 2 indicated on the tachometer 7 bring about an adjustment of the pressure control valve 10 to such an extent that the loss in the chucking force will be compensated for by an increase in the pressure exerted by the pressure fluid operable cylinder piston assembly 5, 5a.

In order to be able to adapt the change in pressure in the pressure fluid operable cylinder piston assembly 5, 5a as a function of the speed to the differing respective conditions, it is provided that the characteristic line of the pressure change can be set or adjusted in the electronic control unit 8. Due to this setting or adjustment it is possible to take into consideration different weights of the attachment jaws 3c, different positions of the jaws, different chuck designs influencing the respective centrifugal forces, and the type of chucking the work piece, namely whether it is chucked from the outside or from the inside. Moreover it is possible in the electronic control unit 8 to set the minimum pressure and the speed from which on the pressure control will become effective.

Figure 3:
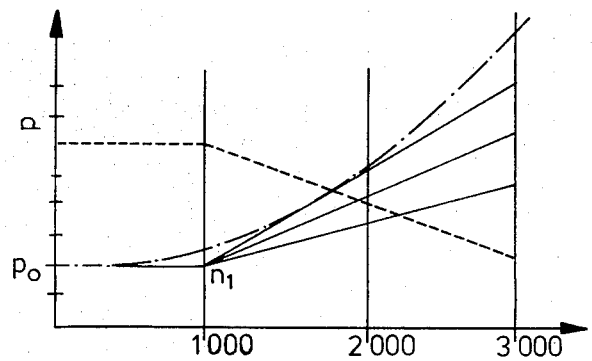
FIG. 3 represents a diagram of the adjustable characteristic lines for the chuck according to the invention.

While for the above mentioned factors and features of an outside chucking as illustrated in FIG. 1 three different characteristic lines are shown as full lines in the diagram of FIG. 3, the characteristic line shown as dash line in FIG. 3 represents the dropping characteristic line for the course of the pressure when employing a chuck for chucking a workpiece from the inside. With an inside chucking the centrifugal force F acts upon the chucking elements so as to increase the chucking force, which means that with increasing speed a reduction in the pressure in the pressure fluid operable cylinder piston assembly 5, 5a should occur. Also this reduction in pressure can be set or adjusted in the electronic control unit 8 in which instance, of course, also the various conditions above referred to can be taken into consideration. The corresponding characteristic line shown as dot-dash line in FIG. 3 indicates a continuous adaptation to the respective changing conditions.

The features of the present invention include a clamping jaw of which the clamping force is controlled dependent upon force effective on the clamping elements capable of being regulated by pressure change in the pressure medium cylinder of the clamping jaw, whereby this pressure regulation is effected by way of an electronic control unit 8 that is influenced by way of an emitter for receiving the clamping force or for receiving the torque or ratational moment utilized for clamping.

FIG. 1 of the drawing illustrates dot-dash lines to represent an arrangement with an emitter for receiving the clamping force and full lines representing an arrangement with an emitter for receiving the torque or rotational moment applied for clamping. The arrangement mentioned encompasses a pressure measuring can or unit 11 which is arranged between the carriage 12 and the support or holding means 13 for the cutting steel 14. This pressure measuring can or container serves as an emitter for the electronic control unit 8 with which the same is connected by way of a control line 8c. According to the magnitude of the clamping force arising in the cutting steel 14 that becomes measured by the pressure measuring can or container 11, there occurs accordingly a pressure change in the pressure medium cylinder 5 by means of a pump mechanism 9 as well as an electronic control unit 8 described in the disclosure.

Further there is noted that the torque or rotational moment applied for chip removal serves for controlling the pressure effecting the clamping force. As FIG. 1 illustrates in full lines, the spindle 2 is driven by a motor 17 by way of two gears or toothed wheels 15, 16. On this motor 17 there is mounted a measuring device 18 which determines the torque or rotational moment applied by the motor. This measuring device 18 is connected with the electronic control unit 8 by way of control line 8d so that on the other hand by way of this electrical control unit 8 and the pump mechanism 9 there is possible a change of the pressure in the pressure medium cylinder 5 and particularly dependent upon the torque or rotational moment applied by the motor 17 and determined by way of the measuring device 18 as brought about for chip removal.

The magnitude of the pressure change can be set both at the measuring device 18 and also at the pump 9a on the pumping mechanism 9 as both arrows indicate at the pertaining mechanism. Additionally there is to be mentioned that it is entirely possible that both arrangements can be provided simultaneously.

It is, of course, to be understood that the present invention is, by no means, limited to the particular showing in the drawings. The embodiment described and shown in the drawings is merely intended to explain the essence of the present invention which is applicable to chucks which are actuated by compressed air as well as to chucks which are hydraulically actuated. A corresponding design may also or additionally be employed for adapting the chucking force to changing chip removing forces in which instance the chip removing force may be ascertained either by a force meter 11 on the cutting tool or by means of a torque meter 18 on the spindle.

What we claim is:

1. A chuck unit for turning machines, which includes: a rotatable chuck having a plurality of clamping jaws, a pressure fluid operable cylinder piston assembly rotatable with said chuck and connected thereto for actuating said clamping jaws, and control means operatively connected to said pressure fluid operable cylinder piston assembly and responsive to forces affecting the originally set clamping forces exerted upon a workpiece in the jaws of the chuck at the standstill thereof for bringing about a change in pressure in said cylinder piston assembly to thereby correspondingly change the clamping pressure of said chuck.

2. A chuck unit according to claim 1, which includes pressure control valve means for controlling the pressure in said cylinder piston assembly, and in which said control means include a tachometer operatively connected to said chuck so as to be rotatable at a speed proportional to the speed of said chuck, and also include electronic control means operatively connected to said tachometer and to said pressure control valve means.

3. A chuck unit according to claim 1, which includes pressure control valve means for controlling the pressure in said cylinder piston assembly, and in which said control means include a meter for ascertaining the force acting upon a chip removing tool in said chuck during its chip removing action, and also include electronic control means operatively connected to said meter and to said pressure control valve means.

4. A chuck unit according to claim 2, which includes a pump unit for supplying pressure fluid to said cylinder piston assembly, and in which said pressure control valve means forms a part of said pump unit.

5. A chuck unit according to claim 3, which includes a pump unit for supplying pressure fluid to said cylinder piston assembly, and in which said pressure control valve means forms a part of said pump unit.

6. A chuck unit according to claim 1, in which said control means includes means for setting the initiation of effecting a change in pressure in said cylinder piston assembly in conformity with different characteristics of the chuck unit.

* * * * *